May 2, 1933. R. M. LOVEJOY 1,906,387
FLUID ACTUATED CONTROLLING MECHANISM FOR MULTISPINDLE DRILLS, ETC
Filed July 28, 1930 3 Sheets-Sheet 1

Inventor.
Ralph M. Lovejoy
by Heard Smith & Tennant.
Attys.

May 2, 1933. R. M. LOVEJOY 1,906,387
FLUID ACTUATED CONTROLLING MECHANISM FOR MULTISPINDLE DRILLS, ETC
Filed July 28, 1930 3 Sheets-Sheet 2

Inventor.
Ralph M. Lovejoy
by Heard Smith & Tennant.
Attys.

May 2, 1933.    R. M. LOVEJOY    1,906,387
FLUID ACTUATED CONTROLLING MECHANISM FOR MULTISPINDLE DRILLS, ETC
Filed July 28, 1930    3 Sheets-Sheet 3
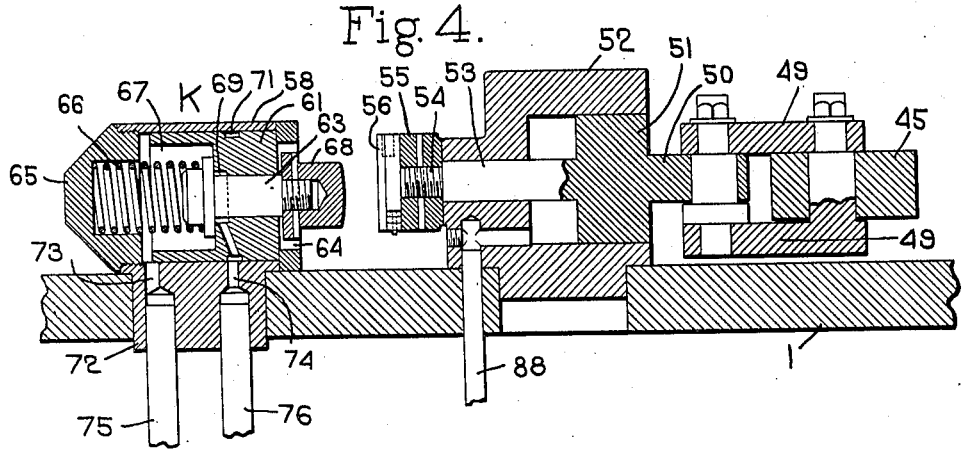
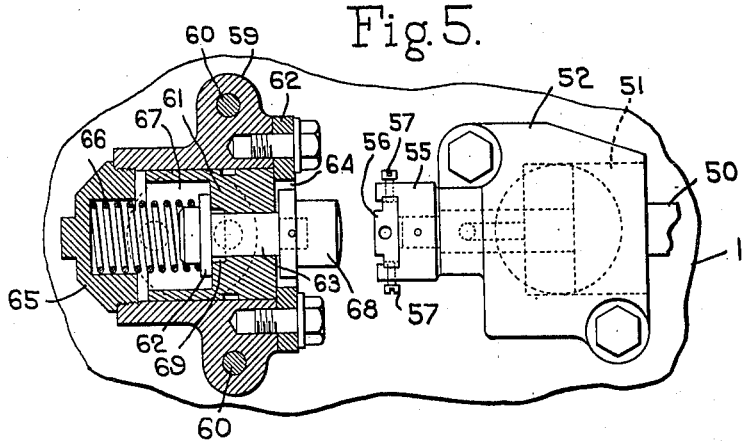
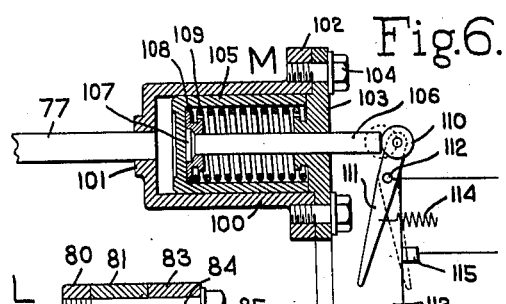
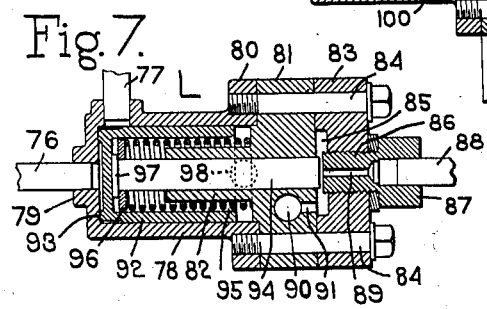
Inventor.
Ralph M. Lovejoy
by Heard Smith & Tennant
Attys.

Patented May 2, 1933

1,906,387

UNITED STATES PATENT OFFICE

RALPH M. LOVEJOY, OF BOSTON, MASSACHUSETTS

FLUID ACTUATED CONTROLLING MECHANISM FOR MULTISPINDLE DRILLS, ETC.

Application filed July 28, 1930. Serial No. 471,234.

This invention relates to improvements in fluid operated controlling mechanism for automatic drilling machines, and machines for other purposes, in which the work is carried by a traveling carrier successively to a plurality of stations, at certain of which it is operated upon by a tool, such as a drill, a countersink, a reamer, or other suitable tool, and in which the operations of various parts are effected by controlling mechanisms responsive to the energization or de-energization of a fluid medium.

More particularly the invention relates to improvements in drilling machines and machines of like character of the type disclosed in my prior applications for patent Serial Number 171,316, filed February 26, 1927, for Drilling machines and machines for other purposes, and Serial Number 441,387, filed April 3, 1930, for Fluid operated control for multi-spindle drills. These machines comprise a travelling carrier having supports for the work, means for actuating the carrier to present the work successively at a plurality of stations, tools at said stations, means for feeding the tools to and from the work, means for arresting the travelling carrier with the work presented at said stations, means for locking the carrier at said stations during the operation of the tools upon the work, means for releasing the locking means to permit the actuation of the travelling carrier, and means automatically operable by the means for arresting the movement of the travelling carrier to render inoperative the means for actuating the carrier, with fluid-controlled means for automatically effecting and determining the sequence of operations.

The construction disclosed in my prior application Serial Number 171,316, comprises a fluid control in which a continuous circulation of fluid is maintained, with means for cutting off or restricting the flow of fluid through certain conduits for the purpose of energizing the same by the building up of fluid pressure and utilizing said pressure to effect certain operations and by the release of pressure in certain conduits to effect certain other operations of the parts.

The later application, Serial Number 441,387, comprises certain improvements upon the prior construction including the provision of various safety mechanisms operable to prevent improper actuation of the different parts of the machine which are controlled by fluid under pressure by-passed from the source of fluid supply upon the operation of a main controlling valve, with fluid-retarding means operable to delay the action of certain mechanisms to insure proper sequence of operation.

In each of the prior constructions the carrier-actuating mechanism and the tool-feeding mechanism are respectively actuated by electric motors through clutch mechanisms, and mechanical means, operable by the means for arresting the carrier, are provided to release the clutch of the carrier-actuating mechanism.

The present invention comprises the provision of fluid-actuated means operable by the yielding movement of the stop mechanism for the travelling carrier to control the carrier-actuating mechanism.

Where, as in machines of this type, the moving parts are heavy and the intermittent operations thereof are frequent, the clutch mechanisms for controlling the same are subject to wear which interferes with the efficiency of their operation and are necessarily of such character as to be more or less subject to deterioration and breakage.

More specifically one of the important objects of the invention is to provide fluid pressure means for controlling the actuation of the carrier-actuating mechanism and tool-feeding mechanism which will eliminate the use of clutches.

In the prior constructions the stop mechanism for the travelling carrier comprises a dash pot which gradually arrests the movement of the carrier.

A further object of the invention is to provide a yielding stop mechanism with means which will limit its yielding movement and thereby arrest the movement of the carrier positively with the work presented in approximately the proper position at the tool stations and which will avoid the possibility of undesirable overthrow due to the inertia of the moving parts.

In the machines disclosed in my prior applications electrical controlling means are provided for preventing actuation of the carrier-actuating means unless and until all of the tools have been removed from the work and pressure of the fluid upon the carrier-locking means released, at which time the carrier-actuating mechanism may become effective if the electric circuit has been properly completed by withdrawal of the tools from the work.

Another object of the present invention is to provide means operable upon discontinuance of the supply of fluid under pressure, either by the stoppage of the means for supplying fluid under pressure or by the breakage of one of the pipes in the controlling system, to prevent the actuation of the carrier-feeding mechanism which otherwise might be operated upon such release of pressure.

These and other objects and features of the invention will more fully appear from the following description and the accompanying drawings and will be particularly pointed out in the claims, together with reference to the disclosure of said prior applications.

In the drawings:

Fig. 4 is a vertical sectional view, on an enlarged scale, of the dash pot for arresting the travelling carrier and the fluid-operated mechanism which is actuated upon yielding movement of the plunger of the dash pot to render the carrier-actuating mechanism inoperative;

Fig. 5 is a detail plan view of the dash pot illustrated in Fig. 4, and a horizontal sectional view of the fluid-operated mechanism which is actuated upon yielding movement of the plunger of the dash pot to render the carrier-actuating mechanism inoperative;

Fig. 6 is an enlarged detail view, mainly in vertical section, of fluid pressure operated means for controlling a switch in a circuit which in turn controls the power circuit of the motor which drives the carrier-actuating mechanism;

Fig. 7 is an enlarged detail view, mainly in vertical section, of the fluid-actuated mechanism which limits the yielding movement of the dash pot plunger; and, Fig. 8 is a vertical sectional view of a preferred form of retarder for controlling the flow of fluid under pressure supplied to the switch-actuating means of the electric circuit which controls the action of the carrier-actuating motor.

Figure 1:
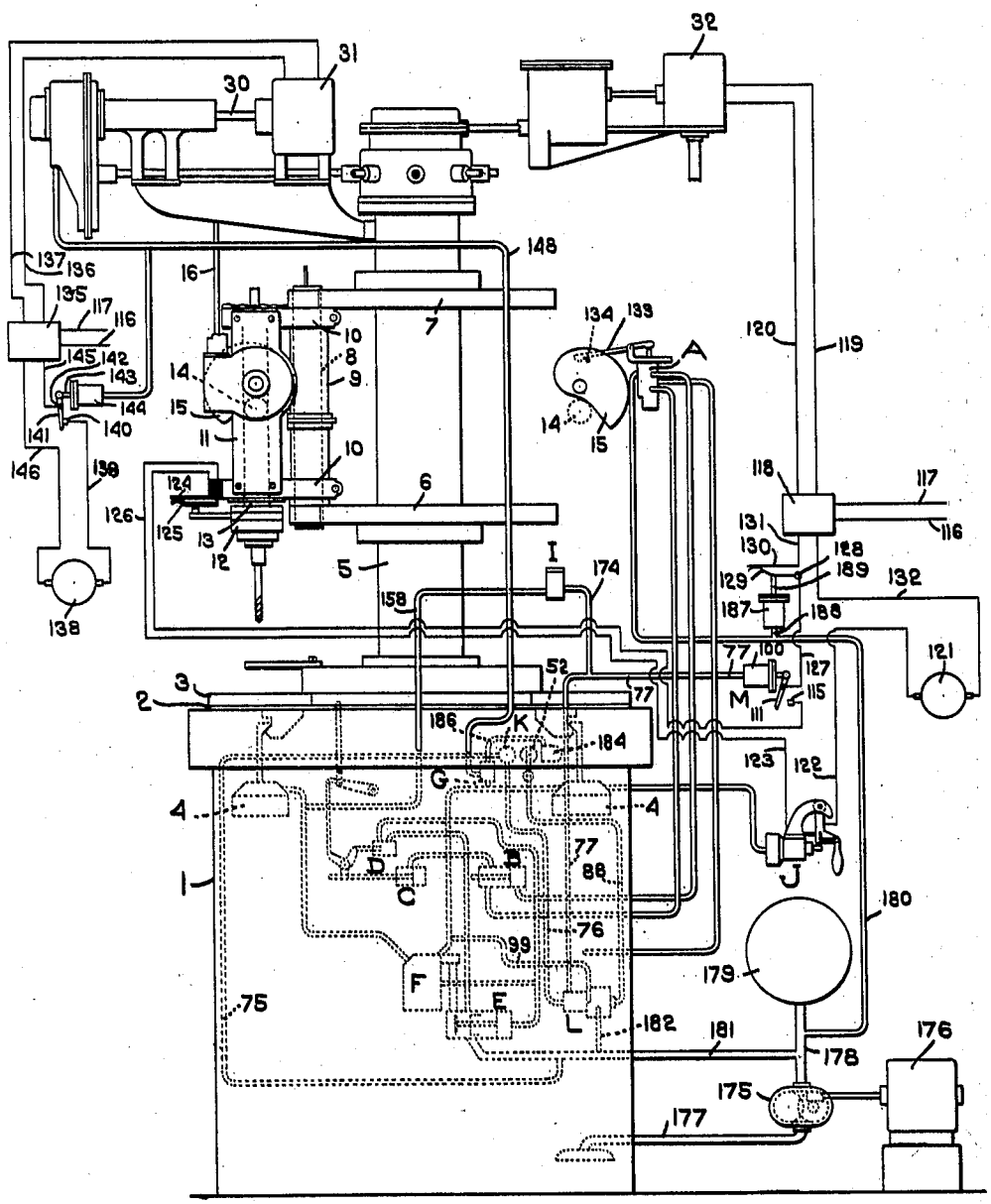
Fig. 1 is a general view of a drill embodying the invention and a single drilling unit being shown, and the controlling mechanism mainly illustrated in diagrammatic form.
Figure 2:
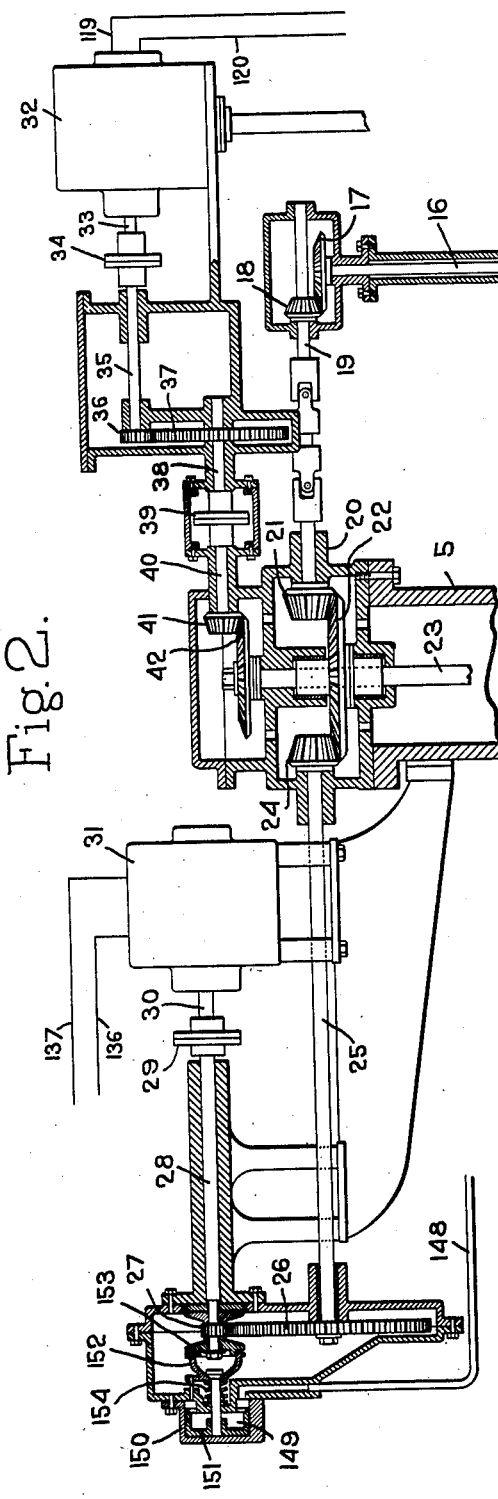
Fig. 2 is a detail view, mainly in vertical section, of the driving mechanism for the tool-feeding mechanism and the driving mechanism for the carrier-actuating mechanism.

Much of the construction of the present machine is identical with that disclosed in my prior application Serial Number 441,387, and detail illustration thereof is unnecessary to the disclosure of the present invention. In order, however, more clearly to identify the present invention and the disclosure with that of the prior application, the same letters are used herein to identify the controlling units for the fluid under pressure.

The construction illustrated in the accompanying drawings comprise a heavy hollow base 1, desirably of cylindrical form, which provides a reservoir for oil or other suitable fluid. A travelling carrier, in the form of a rotatable table 2, is mounted upon said base and carries a plurality of independent work-supporting members 3, preferably in the form if flat sectors which are slidably supported upon the table 2 and are movable relatively thereto both radially and circumferentially. Fluid-operated positioning means 4 carried by the base are provided at each tool station and are operable to position, and preferably also to lock, the work-supporting sectors accurately in a predetermined position at each tool station irrespective of the correct position of the travelling carrier.

A central hollow column 5 is mounted upon the base and is provided with spaced-apart plates or brackets 6 and 7 which are fixedly secured to the column 5. Hollow vertical posts 8, (one of which is shown), corresponding to the number of tool stations and located at uniformly separated intervals, preferably extend through and are secured to the brackets 6 and 7 near their peripheries. Sleeves 9, which desirably are bored eccentrically, are rotatably mounted upon these columns between the brackets 6 and 7 and provide supports for the frames of the respective tool carriers. Upper and lower brackets having semi-cylindrical sections 10 clamped upon the sleeves 9 support each tool-carrying frame 11.

The tool, which may be a drill, reamer, or other device, is mounted in a chuck 12 which is connected to the end of a rotatable spindle which desirably is driven by an independent motor and is rotatably mounted within a sliding member 13 reciprocably mounted in said tool-carrying frame 11.

*The tool-feeding mechanism*

The sliding member 13 is provided with a laterally extending roll 14 which is engaged by a tool-feeding cam 15 mounted upon the frame 11. The tool-feeding cam is actuated through a worm gear which is secured to the cam 15, or its shaft, and is engaged by a worm having a preferably vertical shaft 16, the upper end of which is provided with a beveled pinion 17 which meshes with a complementary pinion 18 upon a shaft 19, preferably formed in alined sections connected by a universal joint, and journalled in a housing 20 mounted upon the upper end of the column 5. The shaft 19 is provided with a beveled pinion 21 which engages a beveled ring gear 22 which is rotatably mounted upon a vertical shaft 23, through which rotative movement is transmitted to the rotating table as more fully disclosed in my prior applications.

The ring gear 22 is engaged by a beveled pinion 24 upon a shaft 25 having on its opposite end a gear 26 which is driven by a pinion 27 upon a shaft 28 which is connected through a flexible coupling 29 to the shaft 30 of a motor 31.

The tool-feeding construction illustrated is substantially identical with that disclosed in my prior application Serial Number 441,387, aforesaid, but differs therefrom in that the shaft 28 is driven directly from the motor 31 instead of through a fluid-actuated clutch mechanism. The fluid-actuated clutch mechanism, however, of the older construction may if desired be employed in connection with the present invention.

*The table-rotating mechanism*

The rotating table is actuated by a motor 32, the shaft 33 of which is connected by a flexible coupling 34 to a shaft 35 in axial alinement therewith, the opposite end of which is provided with a pinion 36 which engages a gear 37 upon a shaft 38 which is connected by a flexible coupling 39 to a shaft 40 having at its opposite end a beveled pinion 41 which engages a beveled gear 42 which is fixedly secured to the upper end of the shaft 23 which drives the table-rotating mechanism. This construction is substantially the same as that disclosed in my prior applications aforesaid except that the clutch mechanism for transmitting power from the motor to the vertical shaft 23 is omitted and the table-actuating shaft 23 driven from the motor, other fluid-operated means being provided for controlling a power circuit leading to the electric motor 32.

*The carrier-arresting mechanism*

Inasmuch as the rotating table, the work supports, and the work carried thereby are of great weight and when under motion acquire considerable momentum, it is desirable that means shall be provided for cushioning the stoppage of the table, thereby preventing undue jar and avoiding the likelihood of overthrow or rebound which might occur by the sudden stoppage of the table.

Furthermore, strain imposed upon clutch mechanisms operable to cause frequent intermittent movements of the carrier from the position of rest cause co-operating clutch members to wear rapidly and thereby interfere with proper and accurate operation.

One of the principal objects of the present invention is to provide fluid-operated means for positively controlling the actuation of the carrier. This is accomplished by providing a fluid-operated switch, for controlling the current supplied to the motor which drives the carrier-actuating mechanism, and providing the conduit which conducts fluid under pressure to the fluid-operated switch, with controlling means actuated by the carrier-arresting means. The fluid control for the carrier-arresting means, which is designated herein as Unit "K", comprises valve mechanism which is operable by the yielding movement of the stop mechanism for the travelling carrier to supply fluid under pressure to the fluid-operated switch of the controlling circuit and cause the same to break the power circuit of the carrier-actuating motor.

A further object of the invention is to provide means for positively limiting the yielding movement of the stop mechanism after it is moved a predetermined distance to avoid overthrow or rebound and insure proper presentation of the work at the respective tool stations.

In order to limit the yielding movement of the stop mechanism to prevent overthrow, the fluid under pressure, which is passed through the fluid control of the carrier-arresting means, Unit K, is caused to actuate means for positively limiting the yielding movement of the stop mechanism after it is moved a predetermined distance. In the preferred embodiment of the invention disclosed herein the stop mechanism comprises a dash pot, and fluid passing through the Unit K is conducted through a valve mechanism having means operable when actuated to shut off the flow of fluid from the relief port of the dash pot. This mechanism will be referred to herein as the dash pot control, Unit L.

Figure 3:
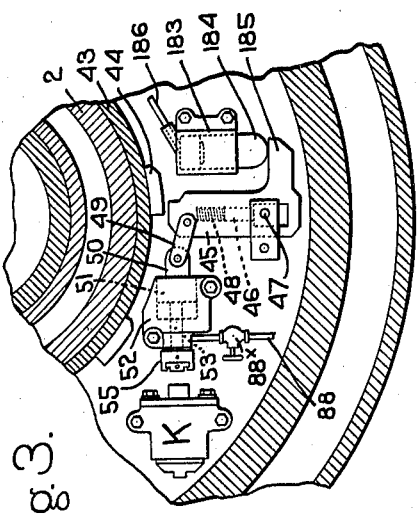
Fig. 3 is a broken-away horizontal sectional view illustrating particularly the work carrier arresting mechanism and the fluid-operated means for controlling the table-actuating mechanism.

In the present construction, as illustrated in Fig. 3, the ring gear 43, which is secured to the rotating table 2, (as more fully disclosed in my prior applications), is provided with a series of blocks 44 corresponding to the respective tool stations which are adapted to engage a stop member or latch 45 which is slidably movable into the path of the blocks 44 and when engaged thereby is capable of a pivotal movement. In the preferred construction illustrated the stop member 45 is L-shaped and is provided with a longitudinal slot which is traversed by a pin 46 which is pivotally mounted upon a pin 47 carried by a bracket secured to the upper wall of the base 1.

A spiral spring 48, seated in a cylindrical bore in the stop 45, abuts at one end against the pin 46, and at its opposite end against the end of the bore and tends normally to force the stop 46 into position to be engaged by the blocks 44 of the rotating table. Links 49 are pivotally connected at one end to the stop 45 and at their opposite ends to the stem 50 of a piston 51 which is slidably mounted in the cylindrical chamber of a dash pot 52 which also is secured to the base 1. The piston 51 is also provided with another stem 53 journalled in a bearing in the wall of the dash pot and provided with a screw threaded end 54 upon which a block 55 is mounted and secured against rotation thereupon by a pin extending through said block and the end portion of the piston stem 53. The block 55 desirably is provided with a vertical recess having undercut walls to receive a preferably hardened abutment member 56 which may be releasably secured in said recess by set screws 57 exending through the side walls of the recess.

By reason of this construction the abutment member 56 can be removed and replaced by such thicker or thinner abutment member as may be desirable to enable the piston properly to actuate the fluid control of the table-arresting mechanism which is actuated by the yielding movement of the dash pot plunger.

The fluid control of the table-arresting mechanism—Unit K

The fluid control of the table-arresting mechanism, Unit K, which is illustrated in detail in Figs. 4 and 5, comprises a preferably cylindrical casing 58 having ears 59 which are preferably secured by bolts 60 to the upper wall of the base. A chambered valve 61 is slidably mounted in the casing and is limited in its movement in one direction, to the right, by a collar or plate 62 which is secured by bolts to the end of the casing and has a central cylindrical aperture 64 to permit the reciprocation therethrough of the valve stem 63 and head of a supplemental valve. The opposite end of the casing is closed by a screw threaded plug 65 having a central cylindrical chamber which receives and forms an abutment for one end of a spring 66, the opposite end of which extends into a chamber 67 in the adjacent end of the valve 61 and engages the flange or collar upon the valve stem 63 which forms a supplemental valve. The valve stem 63 slidably fits a suitable axial bore in the piston 61 and has screwed and pinned, or otherwise secured, to its opposite end an enlarged head 68 adapted to be engaged by the abutment 56 upon the dash pot stem 53.

The chamber 67 of the piston has a central extension or countersunk portion 69 which surrounds the valve stem 63 and one or more ports 70 lead from the countersink 69 to an annular groove 71 in the valve 61 which is adapted to be placed into or out of communication with the port of a fluid delivery conduit leading to the dash pot control, Unit L, as will hereinafter more fully appear.

The flange 67x upon the valve stem 63 constitutes a valve controlling the flow of fluid from the chamber 67 of the valve 61 to the recess or countersink 69 which communicates with the port or ports 70 leading to the annular groove 71 which communicates with the fluid-delivery conduit. The port of the fluid-delivery conduit. The valve 61 is somewhat shorter than the chamber of the casing 58. A block 72, which is secured in a suitable recess in the upper wall of the table 1, is provided with a port 73 adapted to communicate with the chamber of the valve casing 58 when the valve is actuated by the spring 66, but to be cut off from communication with said chamber when the valve 61 is moved sufficiently to the left by engagement of the abutment 56 of the dash pot piston stem with the head 68 of the valve stem 63.

The block 72 is also provided with a port 74 adapted to register with the groove 71 of the valve when the valve is moved to the right by the spring, as illustrated in Fig. 4, or to be cut off from communication therewith upon movement of the valve 61 to the left by the engagement of the abutment 56 of the dash pot stem with the head 68 of the valve stem 63. The head of the valve stem 63 is set a sufficient distance from the end of the piston 60 that the movement of the valve stem 63, caused by the initial engagement of the head 68 by the abutment 56 upon the dash pot stem, will move the supplemental valve 67x on the valve stem 63 out of engagement with the base of the chamber 67, thereby establishing communication between the port 70 and the chamber 67 of the valve 61.

A pipe 75 leads from the fluid pressure supply to the port 73 and serves to maintain fluid under pressure in the chamber 67 of the valve 61 when the parts are in the position shown in Fig. 4 at which time the supplemental valve 67x upon the valve stem 63 closes the recess 69 which communicates through the port 70 with the port 74. A pipe 76 leads from the port 74 to the dash pot control, Unit L, and another conduit 77 leads from the dash pot control to the fluid-actuated mechanism for controlling the actuation of the carrier which, as illustrated herein, is a switch in the electric circuit controlling the supply of current to the carrier-actuating motor 32.

The dash pot control—Unit L

The dash pot control—Unit L comprises a cylinder 78 having at one end a boss 79 provided with a bore which receives the end of the pipe 76. The opposite end of the cylinder is provided with an annular flange 80 against which a block 81 is seated, the block having a cylindrical extension 82 of smaller diameter than the bore of the cylinder extending axially into the cylinder. A clamping block 83 engages the block 81 and bolts 84, extending through both blocks having screw threaded engagement with complementary sockets in the flange 80, serve to clamp the parts together.

The block 83 is provided with a recess 85 adjacent the face of the block 81 and is also provided with a central screw threaded bore which receives the stem 86 of a coupling member 87 for a pipe 88 which communicates with the outlet port of the dash pot 52. The pipe 88 desirably is provided with a restricting valve 88x as illustrated in Fig. 3. The stem 86 of the coupling member extends a short distance into the recess 85 and is provided with a restricted central bore 89 which communicates with the recess 85 and pipe 88.

The block 81 is provided with a bore 90 through which fluid under pressure is supplied and delivered from said bore through a port 91 to the chamber 85, as will hereinafter more fully appear.

A chambered valve 92 is reciprocally mounted in the cylinder 78 and has a peripheral bearing 93 adapted to engage the end wall of the cylinder. A supplemental cylindrical valve 94 is slidably mounted axially of the cylinder in the block 81 and extension 82 thereof, and a spiral spring 95, seated at one end against the face of the block 81 and at its opposite end engaging a plate 96 which in turn engages a flange 97 upon the end of the valve 94 serves to force the supplemental valve 94 to the left out of engagement with the end of the stem 89, and also serves to force the chambered valve 92 into engagement with the end wall of the cylinder 78.

The fluid control for the table-arresting mechanism, Unit K, is located at such distance from the normal position of the abutment member 56 upon the end of the stem 53 of the dash pot piston that the dash pot plunger, when actuated by engagement with one of the members of the travelling carrier, will have nearly arrested the carrier before the abutment 56 engages the head 68 of the valve stem 63. Further movement of the dash pot plunger will cause the actuation of the valve stem 63 first to remove the supplemental valve 67x from its seat, thereby permitting the fluid under pressure supplied through the pipe 75 to the chamber 67 to flow through the recess 69, and ports 70 and 74 to the pipe 76. The fluid under pressure flowing through the pipe 76 thereupon forces the chambered piston 92 inwardly, to the right, against the pressure of the spring 95, thereby establishing communication with the pipe 77 which leads to the fluid-actuating mechanism for controlling the actuation of the carrier. At the same time, the movement of the chambered piston 92 forces the supplemental valve 94 against the end of the stem 86 of the coupling which communicates with the pipe 88 leading from the outlet port of the dash pot, thereby stopping the flow of fluid from the dash pot and positively limiting the further movement thereof, and consequently arresting the carrier at a predetermined position.

In order to insure proper operation of the chambered valve 92 and the supplemental valve 94, the cylinder is provided with a port 98 which communicates with a pipe 99 leading to the distributor, Unit F, forming part of the fluid controlling mechanism disclosed in my prior application Serial Number 441,387, so that the chambered valve 92 is held in seated position against the end of the cylinder by fluid under pressure during the operation of the tools, thereby insuring prevention of actuation of the carrier-actuating mechanism and upon relief of fluid pressure in the Unit F permitting the escape of the fluid from the cylinder 78 and also any fluid which might leak by the chambered piston 92 into the cylinder.

While the fluid under pressure, which passes into the pipe 77, may be employed to operate positively any suitable mechanism for causing actuation of the travelling carrier, the preferred mechanism illustrated in the accompanying drawings comprises a fluid-operated switch which when actuated by fluid pressure breaks the power circuit of the carrier-actuating motor. This fluid-actuating mechanism is in the form of a unit which will be referred to as Fluid operated switch mechanism—Unit M.

The Unit M comprises a cylinder 100 having upon one end a boss 101 provided with a central aperture in which the end of the pipe 77 is connected. The opposite end of the cylinder is provided with an annular flange 102 to which a cover plate 103 is secured by machine bolts 104. The cover plate may be provided with an extension adapted to be secured to any suitable support, and also to support the switch of an electric circuit.

A chambered piston 105 is reciprocably mounted in the cylinder with its closed end extending toward the pipe 77 and provided with a shallow external recess. A piston rod 106 is slidably mounted in a central bearing in the cover plate 103 and is provided at its opposite end with an enlarged head 107 which is engaged by a disk 108 having a central recessed boss mounted upon the piston rod 106. A spiral spring 109 is interposed between the cover plate 103 and the disk 108 and operates normally to maintain the closed head of the piston in engagement with the head of the cylinder and the piston rod 106 retracted. The end of the piston rod is adapted to engage a follower, preferably a roller 110 in the end of a switch arm 111 which is pivotally mounted upon a post 112 forming a terminal of one of the conductors of an electric circuit and mounted upon a suitable base 113. A spring 114, connected to the switch arm 111 and at its other end to a suitable support (not shown) provides means for normally holding the switch in engagement with the terminal 115 of the other conductor of the electric circuit.

When pressure is introduced into the cylinder through the pipe 77, the piston will be forced inwardly to the left, Fig. 6, thereby causing the piston rod 106 to swing the switch arm about its pivot, and thereby break the electric circuit. Upon release of pressure the spring 109 acting upon the disk 108, withdraws the piston 106 from engagement with the roller 110 of the switch arm and the spring 114 restores the switch into engagement with the terminal 115, thereby completing the circuit.

In the construction illustrated an electric current is supplied through service lines 116 and 117 through a magnetic switch 118 to the conductors 119 and 120 leading to the carrier-actuating motor 32. The magnetic switch of the power line is controlled by an electric safety circuit of relatively low voltage and amperage similar to the circuit illustrated in my prior applications which prevents the operation of the carrier-actuating means unless and until all of the tools have been raised out of the work to a predetermined height.

In the construction illustrated the safety circuit comprises a suitable source of power, such as a small generator 121 having a conductor 122 leading to the manual safety switch, Unit J, as disclosed in my prior application, thence through the conductor 123 to the switch members 124—125 which are carried by the bracket 107 of the tool carrier. The co-operating switch member 125 is connected to a conductor 126 which leads to the terminal 115 of the fluid-actuated switch, unit M.

Another conductor 127 leads from the post 112 of said switch member to the post 128 upon which another switch member 129 is pivotally mounted, the co-operating member 130 thereof being connected by a conductor 131 to the magnetic switch. A return conductor 132 leads from the magnetic switch to the generator 121.

When all of the switch members of this safety circuit are closed, the magnetic switch 118 is actuated to supply an electric current to the carrier-actuating motor, but upon interruption of the circuit, by the opening of any switch, said electric motor is rendered inoperative and actuation of the travelling carrier prevented.

The fluid-actuating mechanism for determining the sequence of operation of various parts of the machine, including the main control valve, Unit A, having a pivotally mounted actuating arm 133 adapted to be engaged by a pin 134 upon one of the tool-feeding cams 15 when the tool is raised to a predetermined height, and the pressure-operated controlling mechanism governed by the main control valve, Unit A, including the by-pass valve Unit B, the table feeler control and cut-off Unit C, the main pressure cut-off Unit D, the main admission valve Unit E, the distributor Unit F, the retarder for the tool feed control Unit G, and mechanisms operated thereby, may be the same as those disclosed in my prior application Serial Number 441,387, and need not be further explained in detail in this application.

The present construction differs therefrom in the manner heretofore described and also in that a fluid-actuated switch, similar to the switch Unit M, is utilized in the present application for directly controlling the tool-actuating motor in place of the fluid-actuated clutch disclosed in the earlier applications.

In the present construction the power circuits 116 and 117 lead to a magnetic switch 135 from which conductors 136 and 137 supply the electric current to the tool-actuating motor 31 which drives the tool-actuating mechanism directly through the shaft 30 as hereinbefore described instead of through a clutch. The magnetic switch 135 is controlled by a supplemental circuit comprising a generator 138 from which a conductor 139 leads to the terminal 140 of a switch comprising a switch arm 141 which is pivotally mounted upon a post 142 and the end of the switch arm 141 is engaged by the piston 143 of a fluid-actuating switch mechanism 144 which may be and desirably is identical with Unit M, but which acts upon introduction of fluid under pressure into the chamber of the cylinder to swing the switch arm in a direction to close the switch rather than to open it. A conductor 145 leads from the terminal 142 to the magnetic switch and a return conductor 146 leads from the magnetic switch to the generator 138.

Fluid under pressure is supplied to the chamber of the fluid-operated switch mechanism 144 through a pipe 147 which communicates with a pipe 148 through which fluid under pressure is supplied through Unit G as described in my prior application Serial Number 441,387.

The pipe 148 also leads to the chamber 149 of a cylinder 150, the piston 151 of which is connected to a brake 152 which co-operates with a rotatable brake member 153 upon the end of the shaft 28. A spring 154 tends normally to hold the brake members 152 and 153 in engagement, while the fluid under pressure, supplied to the chamber 149 of the cylinder 150 by the pipe 148 simultaneously with the closing of the switch 141 of the circuit which controls the electric current supplied to the tool-actuating motor 31, causes the removal of the brake at and during the time the tool-actuating motor is operated.

In the operation of the machine the retarder G serves to delay the energization of the tool-actuating motor 31 until stoppage of the table-actuating mechanism is insured in a manner similar to that described in my prior application as will be readily understood.

In the prior application means were also provided for retarding the actuation of the travelling carrier or work-supporting table until after the arrest of the tool-feeding mechanism. In the present construction a similar mechanism for effecting the same purpose is employed. This mechanism may be and desirably is the same as the retarder for the table drive control Unit I of the previous application and is similarly designated herein.

*The retarder for the table drive control— Unit I*

Figure 8:
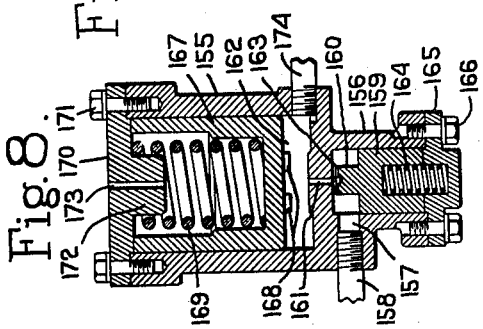

The retarder for the table drive control, Unit I, which is illustrated in detail in Fig. 8, comprises a preferably cylindrical casing 155 having a cylindrical extension 156 provided with a port 157 into the wall of which a pipe 158 is threaded, the pipe 158 desirably communicating with the distributor F through a pipe leading from the distributor F to one of the fluid-operated carrier-positioning and locking devices 4. The cylindrical extension 156 of the cylinder 155 is of smaller diameter than the cylinder and forms a valve chamber containing a valve 159 having an extension 160 of reduced diameter adapted to engage the flat under surface of the end wall of the chamber through which a port 161 communicates with the upper chamber 162 of the casing 155.

The end of the valve extension 160 is provided with a central depression in axial alinement with the port 161 and also with radial grooves 163 adapted to permit a very limited flow of fluid from the valve chamber to and from the chamber 162 of the casing. The body 159 of the valve is provided with a central recess which contains a spiral spring 164 which abuts at one end against the end of the recess and at the other end extends into a recess in a cap 165 which is secured to the outer end of the extension by machine screws 166.

As the fluid under pressure from the pipe 158 enters the chamber of the extension 156, fluid pressure is built up within the chamber which forces the valve 160 away from its seat, thereby permitting the fluid under pressure to pass through the port 161 into the chamber 162 of the casing 155. This chamber is of cylindrical form and as reciprocably mounted therein a hollow cylindrical piston 167, the lower end of which is provided with projections 168 which prevent it from seating upon the wall through which the port 161 extends. A heavy spiral spring 169 is interposed between the head of the piston 167 and a cap 170, which is secured to the casing 155 by machine screws 171. The cap desirably is provided with a central boss 172 extending into the coils of the spring 169 to form a support therefor and is also provided with a central relief port 173 to permit any fluid which accumulates within the hollow piston 167 to escape.

When fluid under pressure is supplied through the pipe 158 it first forces the valve 157 downwardly, thereby permitting fluid under pressure to flow slowly through the port 161 which communicates with the chamber 162, thereby building up pressure in the chamber 162 which raises the piston 167 against the action of the spring 169. Fluid under pressure also passes from the chamber 162 through the pipe 174 to the pipe 77 and thence to the chamber of the fluid-operated switch mechanism, Unit M, thereby forcing the piston 105 thereof inwardly and disengaging the switch member 113 from the terminal 115, thus breaking the safety circuit.

Upon relief of pressure in the pipe 158, the valve 159 will be forced by its spring 160 into engagement with the flat face of the wall between the chamber of the extension and the chamber 162, so that the fluid from the pipe 174 will pass gradually through the restricted port 161 and the grooves 163 in the end of the valve 160. At the same time the spring 169 will force the piston 167 downwardly in the chamber of the casing 155, thereby maintaining the pressure in the pipe 174 for a sufficient length of time to delay the closing of the switch 111 until after the completion of the unlocking of the carrier and the arrest of the table-actuating mechanism. The fluid under pressure released through the pipe 158 is discharged into one of the pipes leading to the Unit F, from which it escapes through the relief ports therein in the manner fully described in my prior application.

Fluid under pressure is supplied to the controlling mechanism by a pump 175 which is driven by an electric motor 176 and draws the fluid, preferably oil, from the reservoir in the base through a pipe 177 and discharges the same into a pipe 178 which communicates with an air chamber 179 adapted to maintain a constant pressure upon the fluid. The pipe 178 communicates with a branch 180 which leads to the main control valve, Unit A. The pipe 178 also communicates with a pipe 181 which leads to the main admission valve, Unit E. A branch pipe 182, which leads from the pipe 181, communicates with the bore 90 in the block 81 of the fluid control for the table-arresting mechanism, Unit L, Fig. 7, and thence through the port 91 to the chamber 85, which in turn communicates through the restricted aperture 89 with the pipe 88 leading to the dash pot, thereby providing means for restoring fluid under pressure to the dash pot after the dash pot piston has been forced inwardly by the engagement of the member 45 with the shouldered members 44 upon the travelling carrier during the gradual arresting of the carrier.

Mechanism similar to that illustrated in my prior application may be employed for releasing the engagement of the member 45 of the dash pot mechanism with the shouldered members 44 of the travelling carrier. Such mechanism comprises a cylinder 183, which is secured to the upper wall of the base 1, having slidably mounted therein a piston 184 which engages the lateral extension 185 of the stop member or latch 45. Fluid under pressure is introduced into the cylinder 183 through a pipe 186 which leads from the retarder for the feed control, Unit G, as in the prior construction. Inasmuch as the retarder, Unit G, delays the passage of fluid under pressure through the pipe 186, after the actuation of the locking mechanism, this stop mechanism will not be released from engagement with the shouldered members 44 of the carrier until the carrier is locked. Upon such disengagement of the stop member or latch, fluid under pressure passing through the pipe 182, the bore 90, the chamber 85, and pipe 88, will gradually restore the piston and its dash pot to normal position. Upon release of pressure in the mechanism for locking the carrier fluid pressure in the cylinder 183 will be relieved and the spring 46 will then restore the stop member 45 into operative position in the path of the shouldered members 44 of the carrier so that the dash pot will again gradually arrest the carrier upon the next intermittent movement thereof.

Another safety feature of the present invention consists in providing means for breaking the circuit of the carrier-actuating motor in the event of failure of pressure or undue reduction of pressure in the pressure-operated controlling system which otherwise might result in improper actuation of the carrier-actuating mechanism. This is accomplished in the present invention by providing another fluid-actuated switch mechanism normally operable to maintain the switch in the safety circuit closed, but operable upon release of pressure to open the switch and thereby break the circuit. The mechanism for accomplishing this purpose, which is illustrated in the accompanying drawings, comprises a fluid-actuated switch mechanism 187 which may be and desirably is identical with the switch-actuating mechanism, Unit M. The chamber of this fluid-actuated switch mechanism communicates through a pipe 188 with the fluid pressure pipe 180 and the plunger 189 thereof engages the switch member 129 which is pivotally mounted upon the post 128 as above described.

The sequence of operation of the mechanisms above described may be and is similar to those described in my prior application Serial Number 441,387.

As illustrated in Fig. 1 of the drawings the controlling mechanisms are shown in the position in which the travelling carrier or rotating table is locked with the work positioned at the respective tool stations. The switch 141, which controls the tool-feeding motor 31, is closed and the tool-feeding mechanism operating. As illustrated, the tools have been withdrawn from the work and the pin 134 upon the tool-feeding cam is in such position that upon further rotation of the cam 15 the main control valve A will be operated to by-pass the fluid under pressure in the manner disclosed in my prior application, thereby unlocking the rotating carrier, and withdrawing the table feeler from operative position, thus permitting the gradual escape of fluid under pressure through the retarder I to permit the spring 109 of the fluid-operated switch mechanism to withdraw the piston 106 from engagement with the switch member 111, so that the spring 114 of said switch mechanism may close the circuit of the carrier-actuating mechanism, and thereupon cause the actuation of the carrier. When the carrier is rotated a sufficient distance to cause one of the blocks 44 thereof to engage the stop member 45 of the dash pot mechanism, the plunger of the dash pot will be forced inwardly, thereby forcing the fluid from its chamber through the pipe 88 into the chamber 85 of Unit L against the fluid pressure supplied to the chamber through the fluid pressure pipes 181 and 182, thus applying a very considerable cushioning force to arrest the rotation of the carrier.

After the plunger of the dash pot has traveled a predetermined distance, the abutment 56 upon the end of the dash pot stem 53 engages the head 68 of the valve stem 66 of Unit K, thereby forcing it inwardly sufficiently to remove the supplemental valve 67x from its seat and permit the pressure in the chamber 67 of Unit K, which is supplied through the pipe 75, to pass through the chamber 69, the ports 70 and 74 into the pipe 76 which leads to the dash pot control, Unit L. As the fluid under pressure enters the cylinder, Unit L, it forces the piston 92 thereof inwardly, to the right, thereby causing the end of the supplemental valve 94 to close the restricted port 89 which communicates with the pipe 88, thereby preventing further escape of fluid from the dash pot and positively checking the movement of the carrier in the proper position to present the work accurately at the tool station.

In the meantime the cam 15 of the tool-feeding mechanism will have rotated sufficiently to cause the pin 134 to pass from beneath the lever 133 of the main control valve which will then be restored to its normal position, thereby causing fluid under pressure to be supplied to the locking mechanism for the carrier and through the retarder Unit G and pipe 148 to the chamber 149 of the brake-releasing mechanism for the tool-actuating motor, and simultaneously therewith through the branch pipe 147 to the fluid-operated switch 144, thereby causing the switch member 141 to close the power circuit leading to the tool-actuating motor 31 and initiating the actuation of the tool-feeding mechanism.

The tools will then be fed to the work by the tool-feeding cams 15 and raised from the work by the usual mechanism disclosed in my prior application until one of the cams has rotated sufficiently to cause its pin 134 to engage the lever 133 of the main control valve, Unit A, whereupon fluid under pressure is by-passed in the manner disclosed in my prior application to release the pressure upon the locking mechanism, and thereafter after a predetermined period of delay to enable the fluid-operated switch mechanism, Unit M, to close the switch 111 of the controlling circuit, which in turn controls the magnetic switch in the main power line leading to the carrier-actuating motor. The controlling circuit cannot, however, be completed unless all of the tools have been raised to a sufficient height to close their switches 124, 125, nor can the controlling circuit be completed if the pressure in the pipe 180 is insufficient to cause the fluid-actuated switch mechanism 187 to close the switch 129, 130. It is, therefore, apparent that no improper operation of the carrier-actuating mechanism can take place.

It will be understood that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. In a machine of the class described comprising a travelling work carrier, means for actuating said carrier, yieldable stop mechanism for arresting said carrier to present the work successively at a plurality of tool stations, and fluid-operated controlling means, means for supplying fluid under pressure thereto including a valve operable by the yielding movement of said stop mechanism to cause said controlling means to render and to maintain said carrier-actuating means inoperative.

2. In a machine of the class described comprising a travelling work carrier, means for actuating said carrier, yieldable stop mechanism for arresting said carrier to present the work successively at a plurality of tool stations, fluid-operated controlling means, means for supplying fluid under pressure thereto including a valve operable by the yielding movement of said stop mechanism to cause said controlling means to render and to maintain said carrier-actuating means inoperative, and means actuated by said fluid-operated controlling means to limit the yielding movement of said stop mechanism and thereby insure proper presentation of the work at said tool stations.

3. In a machine of the class described comprising a travelling work carrier, means for actuating said carrier, a dash pot for arresting said carrier, to present the work successively at a plurality of tool stations, having a plunger provided with means to be engaged by members of said carrier, and fluid-operated controlling means, means for supplying fluid under pressure thereto including a valve operable by the yielding movement of the dash pot plunger to cause said controlling means to render said carrier-actuating means inoperative.

4. In a machine of the class described comprising a travelling work carrier, means for actuating said carrier, a dash pot for arresting said carrier, to present the work successively at a plurality of tool stations, having a plunger provided with means to be engaged by members of said carrier, means for supplying fluid under pressure to said dash pot including a conduit having a restricted passage communicating with the fluid chamber of said dash pot, fluid-operated controlling means, means for supplying fluid under pressure thereto including a valve operable by the yielding movement of the dash pot plunger to cause said controlling means to render said carrier-actuating means inoperative, and means operable by said fluid-controlling means after a predetermined movement of said dash pot to close said conduit and thereby limit the yielding movement of said dash pot plunger to insure proper presentation of the work at the tool stations.

5. In a machine of the class described comprising a travelling work carrier, means for actuating said carrier, a dash pot for arresting said carrier, to present the work successively at a plurality of tool stations, having a plunger provided with means to be engaged by members of said carrier, a conduit having an adjustable restricted passage communicating with the fluid chamber of said dash pot, fluid-operated controlling means, means for supplying fluid under pressure thereto including a valve operable by the yielding movement of the dash pot to render said carrier-actuating means inoperative, fluid-operated means for locking the arrested carrier to position the work accurately at said tool stations, and fluid-operated means operable in conjunction with and by the fluid pressure supplied to said locking means to restore the carrier-engaging means of said arresting mechanism into operative relation to the engaging members of said carrier.

6. In a machine of the class described comprising a travelling work carrier, means for actuating said carrier, a dash pot for arresting said carrier, to present the work successively at a plurality of tool stations, having a plunger provided with means to be engaged by members of said carrier, a conduit having a restricted passage communicating with the fluid chamber of said dash pot, fluid-operated controlling means comprising a supplemental dash pot having means operable by the yielding movement of the dash pot to supply fluid under pressure to means acting to render said carrier-actuating means inoperative, fluid-actuated means at each tool station for locking the arrested carrier, and fluid-operated controlling means operable after the arrest of said carrier to supply fluid under pressure to said locking means, and to the conduit leading to the chamber of said dash pot to restore the carrier-engaging means of said arresting mechanism into operative relation to the engaging members of said carrier.

7. In a machine of the class described comprising a travelling work carrier, means for actuating said carrier, a dash pot for arresting said carrier, to present the work successively at a plurality of tool stations, having a plunger provided with means to be engaged by members of said carrier, a conduit having a restricted passage communicating with the fluid chamber of said dash pot, fluid-operated controlling means comprising a supplemental dash pot having means operable by the yielding movement of the dash pot to supply fluid under pressure to means acting to render said carrier-actuating means inoperative, fluid-actuated means at each tool station for locking the arrested carrier, and fluid-operated controlling means operable after the arrest of said carrier to supply fluid under pressure to said locking means, to the chamber of the dash pot, and to the means for rendering the carrier-actuating means inoperative.

8. In a machine of the class described comprising a travelling work carrier, means for actuating said carrier, a dash pot for arresting said carrier, to present the work successively at a plurality of tool stations, having a plunger provided with means to be engaged by members of said carrier, a conduit having a restricted passage communicating with the fluid chamber of said dash pot, fluid-operated controlling means comprising a supplemental dash pot having means operable by the yielding movement of the dash pot to supply fluid under pressure to means acting to render said carrier-actuating means inoperative, fluid-actuated means at each tool station for locking the arrested carrier, and fluid-operated controlling means operable after the arrest of said carrier to supply fluid under pressure to said locking means, to the chamber of the dash pot, and to the means for rendering the carrier-actuating means inoperative, means for releasing the fluid pressure of said locking means, and means for retarding the release of fluid under pressure from the means for rendering the carrier-actuating means inoperative when fluid under pressure upon said locking means is released.

9. In a machine of the class described comprising a travelling work carrier, means including an electric motor for actuating said carrier, a circuit for supplying an electric current to said motor, a switch controlling said circuit, fluid-operated means for actuating said switch, means for supplying fluid under pressure thereto, yieldable means for arresting said carrier to present the work successively at a plurality of tool stations, and controlling means operable by the yielding movement of said carrier-arresting means when engaged by said carrier to supply fluid under pressure to open said switch and thereby render the table-actuating motor inoperative and locking means operable by the fluid pressure acting upon said switch positively to lock the arrested carrier.

10. In a machine of the class described comprising a travelling work carrier, means including an electric motor for actuating said carrier, a circuit for supplying an electric current to said motor, a switch controlling said circuit, fluid-operated means for actuating said switch, means for supplying fluid under pressure thereto, a dash pot, for arresting said carrier to present the work successively at a plurality of tool stations, having a plunger provided with means to be engaged by members of said carrier, and a valve in the means for supplying fluid under pressure to said switch-operating means operable by the yielding movement of the plunger of said dash pot to supply fluid under pressure to open said switch and locking means operable by the fluid pressure acting upon said switch positively to lock the arrested carrier.

11. In a machine of the class described comprising a travelling work carrier, means including an electric motor for actuating said carrier, a circuit for supplying an electric current to said motor, a switch controlling said circuit, fluid-operated means for actuating said switch, means for supplying fluid under pressure thereto, a dash pot for arresting said carrier to present the work successively at a plurality of tool stations having a plunger provided with means to be engaged by members of said carrier, a conduit communicating with the chamber of the dash pot having a restricted passage for the fluid forced therefrom by said plunger, a valve in the means for supplying fluid under pressure to said switch-operating means operable near the end of the yielding movement of said plunger to cause said fluid under pressure to open said switch, and means operable by the fluid under pressure passing through said valve to close said conduit and thereby limit the yielding movement of said plunger to insure proper positioning of the work at said tool stations.

12. In a machine of the class described comprising a travelling work carrier, means for actuating said carrier to present the work successively at a plurality of tool stations, tools at said stations, tool-feeding means, electric motors operable respectively to actuate said carrier and said tool-feeding means, fluid-operated switches for controlling the operation of the respective motors, means for supplying fluid under pressure to the respective fluid-operated switches operable to close the switch leading to one motor and to open the switch leading to the other motor, and means for automatically controlling the supply of fluid under pressure to said fluid operated switches operable conjointly to reverse said switches.

13. In a machine of the class described comprising a travelling work carrier, means for actuating said carrier to present the work successively at a plurality of tool stations, tools at said stations, tool-feeding means, electric motors operable respectively to actuate said carrier and said tool-feeding means, fluid-operated switches for controlling the operation of the respective motors, means including conduits for supplying fluid under pressure to the respective fluid-operated switches operable to close the switch leading to one motor and to open the switch leading to the other motor, means for automatically controlling the supply of fluid under pressure to said fluid operated switches operable conjointly to reverse said switches and means in the conduits for supplying fluid under pressure to the respective switches operable to retard the closing of one of the switches after the opening of the other and thereby delay the action of its motor until the stoppage of the mechanism operated by the other motor is insured.

14. In a machine of the class described comprising a travelling work carrier, means for actuating said carrier to present the work successively at a plurality of tool stations, tools at said stations, tool-feeding means, electric motors operable respectively to actuate said carrier and said tool-feeding means, fluid-operated switches for controlling the operation of the respective motors, means including conduits for supplying fluid under pressure to the respective fluid-operated switches, operable to close the switch leading to one motor and to open the switch leading to the other motor, and a conduit for fluid under pressure communicating with the conduits leading to the fluid-operated switches of both motor circuits, whereby conjoint action of said fluid-operated switches will be insured.

15. In a machine of the class described comprising a travelling work carrier, means including an electric motor for actuating said carrier to present the work at a plurality of tool stations, tools at said tool stations, tool-feeding means, means including an electric motor for actuating said tool-feeding means, circuits for supplying an electric current to said motors, controlling electric circuits for the respective motors having fluid-operated switches therein, a yieldable stop mechanism for said carrier including a dash pot operable to arrest said carrier with the work presented at said tool stations, fluid-operated switch-actuating means operable by the yielding movement of said carrier-arresting means to supply fluid under pressure to the switch-actuating means of the motor circuit of the carrier-actuating means to break said circuit, fluid-operated means for locking the carrier, means operable upon arrest of said carrier to supply fluid under pressure thereto and to the fluid-operated switch of the circuit controlling the tool-feeding motor to close said switch and thereby cause actuation of the tool-feeding means.

16. In a machine of the class described comprising a travelling work carrier, means including an electric motor for actuating said carrier to present the work at a plurality of tool stations, tools at said tool stations, tool-feeding means, means including an electric motor for actuating said tool-feeding means, circuits for supplying an electric current to said motors, controlling electric circuits for the respective motors having fluid-operated switches therein, a yieldable stop mechanism for said carrier including a dash pot operable to arrest said carrier with the work presented at said tool stations, means for supplying fluid under pressure to said fluid-operated switches, means for controlling the supply of fluid under pressure to said switches respectively operable to break the circuit of the carrier-actuating motor upon arrest of the carrier and to complete the circuit of the tool-actuating motor.

17. In a machine of the class described comprising a travelling work carrier, means including an electric motor for actuating said carrier to present the work at a plurality of tool stations, tools at said tool stations, tool-feeding means, means including an electric motor for actuating said tool-feeding means, circuits for supplying an electric current to said motors, controlling electric circuits for the respective motors having fluid-operated switches therein, a yieldable stop mechanism for said carrier including a dash pot operable to arrest said carrier with the work presented at said tool stations, means for supplying fluid under pressure to said fluid-operated switches, means for controlling the supply of fluid under pressure to said switches operable by a tool-feeding means when the tool has been raised from the work to a predetermined height to cause the release of fluid pressure upon the fluid-operated switches, thereby to break the circuit of the tool-feeding motor and to complete the circuit of the carrier-actuating motor, and means for delaying the release of fluid from the fluid-actuated switch of the carrier-actuating motor until stoppage of the tool-feeding motor is insured.

18. In a machine of the class described comprising a travelling work carrier, means including an electric motor for actuating said carrier to present the work at a plurality of tool stations, tools at said tool stations, tool-feeding means, means including an electric motor for actuating said tool-feeding means, circuits for supplying an electric current to said motors, controlling electric circuits for the respective motors having fluid-operated switches therein, a yieldable stop mechanism for said carrier including a dash pot operable to arrest said carrier with the work presented at said tool stations, fluid-operated means for locking said carrier to position the work at said tool stations, a fluid pressure supply, means for conducting fluid under pressure to the switch-actuating means of the circuit of said carrier-actuating motor, a distributor, means for conducting fluid under pressure to said distributor, means for conducting fluid under pressure from said distributor respectively to said locking means, to said dash pot, and also to the switch-actuating means of the carrier-actuating motor circuit, a main control valve normally positioned to cause fluid under pressure to be supplied to said distributor, means operable by a tool-feeding means when the tool is raised out of the work to a predetermined height to actuate said main control valve, and means operable thereby to release the fluid under pressure from said distributor and the fluid-operated means supplied with fluid pressure therefrom.

19. In a machine of the class described comprising a travelling work carrier, means including an electric motor for actuating said carrier to present the work at a plurality of tool stations, tools at said tool stations, tool-feeding means, means including an electric motor for actuating said tool-feeding means, circuits for supplying an electric current to said motors, controlling electric circuits for the respective motors having fluid-operated switches therein, a yieldable stop mechanism for said carrier including a dash pot operable to arrest said carrier with the work presented at said tool stations, fluid-operated means for locking said carrier to position the work at said tool stations, a fluid pressure supply, means for conducting fluid under pressure to the switch-actuating means of the circuit of said carrier-actuating motor, a distributor, means for conducting fluid under pressure to said distributor, means for conducting fluid under pressure from said distributor respectively to said locking means, to said dash pot, and also to the switch-actuating means of the carrier-actuating motor circuit, a main control valve normally positioned to cause fluid under pressure to be supplied to said distributor, means operable by a tool-feeding means when the tool is raised out of the work to a predetermined height to actuate said main control valve, means operable thereby to release the fluid under pressure from said distributor and the fluid-operated means supplied with fluid pressure therefrom, and means for retarding the release of fluid pressure of the switch controlling the circuit of the carrier-actuating motor whereby said circuit will not be closed until the completion of the unlocking of the carrier and the stoppage of the tool-feeding motor.

20. In a machine of the class described comprising a travelling work carrier, means including an electric motor for actuating said carrier to present the work at a plurality of tool stations, tools at said tool stations, tool-feeding means, means including an electric motor for actuating said tool-feeding means, circuits for supplying an electric current to said motors, controlling electric circuits for the respective motors having fluid-operated switches therein, a yieldable stop mechanism for said carrier including a dash pot operable to arrest said carrier with the work presented at said tool stations, fluid-operated means for locking said carrier to position the work at said tool stations, a fluid pressure supply, means for conducting fluid under pressure to the switch-actuating means of the circuit of said carrier-actuating motor, a distributor, means for conducting fluid under pressure to said distributor, means for conducting fluid under pressure from said distributor respectively to said locking means, to said dash pot, and also to the switch-actuating means of the carrier-actuating motor circuit, a main control valve normally positioned to cause fluid under pressure to be supplied to said distributor, means operable by a tool-feeding means when the tool is raised out of the work to a predetermined height to actuate said main control valve, means operable thereby to release the fluid under pressure from said distributor and the fluid-operated means supplied with fluid pressure therefrom, and means for retarding the release of fluid pressure of the switch controlling the circuit of the tool-feeding motor whereby said circuit will not be closed until the stoppage of the carrier-actuating motor is insured.

21. In a machine of the class described comprising a travelling work carrier, means including an electric motor for actuating said carrier, means for arresting said carrier to present the work successively at a plurality of tool station, tools at said stations, tool-feeding means, a fluid-operated switch controlling the circuit of said carrier-actuating motor, means for supplying fluid under pressure thereto operable to render said carrier-actuating motor inoperative during the operation of the tool-feeding means, and a fluid-operated safety switch in said controlling circuit normally closed by the fluid under pressure, but operable upon failure or undue reduction of fluid pressure to break said motor circuit and thereby prevent improper actuation of said carrier-actuating motor.

22. In a machine of the class described comprising a travelling work carrier, means including an electric motor for actuating said carrier, means for arresting said carrier to present the work successively at a plurality of tool stations, tool-feeding means, a safety circuit controlling said motor circuit having switches adapted to be closed by the tool-feeding means when all of the tools have been raised to a predetermined height, a fluid-operated switch in said safety circuit, means for supplying fluid under pressure thereto operable to render said carrier-actuating motor inoperative during the operation of said tools, a safety switch in said circuit, and fluid-operated means for maintaining said safety switch closed during the operation of said tool-feeding means having means operable to break said circuit upon failure or undue reduction of fluid pressure.

In testimony whereof, I have signed my name to this specification.

RALPH M. LOVEJOY.